(12) United States Patent
Yokomitsu

(10) Patent No.: US 8,284,255 B2
(45) Date of Patent: Oct. 9, 2012

(54) INTER-CAMERA INK RELATION INFORMATION GENERATING APPARATUS

(75) Inventor: Sumio Yokomitsu, Kanagawa (JP)

(73) Assignee: Panasonic Corporation, Osaka (JP)

(*) Notice: Subject to any disclaimer, the term of this patent is extended or adjusted under 35 U.S.C. 154(b) by 534 days.

(21) Appl. No.: 12/529,648

(22) PCT Filed: Feb. 29, 2008

(86) PCT No.: PCT/JP2008/000413
§ 371 (c)(1),
(2), (4) Date: Sep. 2, 2009

(87) PCT Pub. No.: WO2008/108087
PCT Pub. Date: Sep. 12, 2008

(65) Prior Publication Data
US 2010/0097475 A1   Apr. 22, 2010

(30) Foreign Application Priority Data
Mar. 6, 2007   (JP) .................................. 2007-055473

(51) Int. Cl.
*H04N 7/00* (2006.01)
(52) U.S. Cl. ........ 348/159; 348/169; 382/291; 382/294; 382/299
(58) Field of Classification Search ............... 348/169, 348/159, 152; 382/291, 294, 299, 103
See application file for complete search history.

(56) References Cited

U.S. PATENT DOCUMENTS

| | | | | |
|---|---|---|---|---|
| 7,319,479 B1 * | 1/2008 | Crabtree et al. | ............... | 348/169 |
| 7,872,593 B1 * | 1/2011 | Rauscher et al. | ............... | 340/933 |
| 2004/0257444 A1 | 12/2004 | Maruya et al. | | |
| 2006/0028548 A1 * | 2/2006 | Salivar et al. | ................. | 348/143 |

FOREIGN PATENT DOCUMENTS

| | | |
|---|---|---|
| JP | 2004-159151 A | 6/2004 |
| JP | 2005-12415 A | 1/2005 |
| JP | 2006-33329 A | 2/2006 |

OTHER PUBLICATIONS

International Search Report for PCT/JP2008/000413.

* cited by examiner

*Primary Examiner* — Kevin Bates
(74) *Attorney, Agent, or Firm* — Pearne & Gordon LLP

(57) ABSTRACT

The apparatus comprises a feature quantity extraction part for extracting a feature quantity of a subject from video captured by plural cameras, an In/Out point extraction part for extracting In/Out points indicating points in which a subject appears and disappears in each video captured, an In/Out region formation part for forming In/Out regions based on the In/Out points extracted, a correlation value calculation part for calculating a correlation value by obtaining the total sum of similarities every feature quantity of the subject in each of the plural combinations of In/Out points included in the In/Out regions, a frequency histogram creation part for creating a frequency histogram based on the correlation value, and a link relation information generation part for extracting a peak of the frequency histogram and estimating the presence or absence of a link relation between the plural cameras and generating link relation information.

14 Claims, 15 Drawing Sheets

◘ ARRANGEMENT

◘ INTER-CAMERA LINK RELATION INFORMATION

|  | In_1_1 | In_1_2 | In_2_1 | In_2_2 | In_3_1 | In_3_2 |
|---|---|---|---|---|---|---|
| Out_1_1 | — | — | 10%<br>10sec | NA | NA | NA |
| Out_1_2 | — | — | 60%<br>6sec/3sec | 5%<br>4sec | NA | 30%<br>10sec |
| Out_2_1 | NA | 80%<br>5sec/3sec | — | — | 8%<br>8sec | NA |
| Out_2_2 | NA | NA | — | — | 50%<br>5sec/7sec | 40%<br>4sec |
| Out_3_1 | NA | NA | NA | 10%<br>5sec | — | — |
| Out_3_2 | NA | NA | NA | 90%<br>4sec/6sec | — | — |
| Out_3_3 | NA | NA | NA | NA | — | — |

FIG. 15

| cam01 | cam02 | cam03 |
|-------|-------|-------|
| cam04 | cam05 | cam06 |
| cam07 | cam08 | cam09 |

FIG. 16

| cam01 | cam02 | cam03 |
|-------|-------|-------|
| cam04 | cam06 | |
| cam07 | | |

INTER-CAMERA INK RELATION INFORMATION GENERATING APPARATUS

TECHNICAL FIELD

The present invention relates to an inter-camera link relation information generating apparatus capable of doing estimation of a link relation between cameras with high reliability in the case of, for example, tracking a person in a monitoring system constructed of plural monitoring cameras.

BACKGROUND ART

A system for tracking a person etc. by automatically switching camera video displayed on a screen based on a corresponding relation between shooting regions and arrangement of respective cameras grasped previously has been proposed in a system for performing widespread monitoring using monitoring video from plural cameras (for example, see Patent Reference 1).
Patent Reference 1: JP-A-2005-12415 (Pages 4 to 14, FIG. 1)

DISCLOSURE OF THE INVENTION

Problems that the Invention is to Solve

In the case of monitoring a wide range by plural cameras, processing of a link between the plural cameras becomes essential. Particularly, in the case of collating a person between the cameras, collation accuracy of the person improves by using information about a link relation (topology) between the cameras. A method for acquiring this link relation information also includes a method for previously giving the information manually, but there was a problem that processing is complicated as the number of cameras is large. Also, there is a method for automatically doing estimation using an object observed by respective cameras, but there was a problem that accuracy is low since data of error correspondence is large in the method estimated based on frequency distributions of appearance time and disappearance time of all the objects extracted every camera.

Hence, the invention has been implemented in view of the conventional problems described above, and an object of the invention is to provide an inter-camera link relation information generating apparatus capable of improving a reduction in accuracy of the presence or absence of a link relation by error correspondence between cameras and doing estimation of a link relation between cameras with high reliability using only a pair of similar subjects, for example, a pair of persons.

Means for Solving the Problems

An inter-camera link relation information generating apparatus of the invention is characterized by comprising feature quantity extraction means for extracting a feature quantity of a subject from video captured by plural cameras, In/Out point extraction means for extracting an In point indicating a point to which a subject appears and an Out point indicating a point from which a subject disappears in each video captured by the plural cameras, In/Out region formation means for forming an In region including the In point based on the In point extracted by the In/Out point extraction means and an Out region including the Out point based on the Out point extracted by the In/Out point extraction means, correlation value calculation means for calculating a correlation value by obtaining the total sum of similarities every feature quantity of the subject extracted by the feature quantity extraction means in each of the plural combinations of an In point included in the In region and an Out point included in the Out region formed by the In/Out region formation means, frequency histogram creation means for creating a frequency histogram based on the correlation value calculated by the correlation value calculation means, and link relation information generation means for extracting a peak of the frequency histogram created by the frequency histogram creation means and estimating the presence or absence of a link relation between the plural cameras and generating link relation information.

According to the configuration described above, estimation of a link relation between cameras with high reliability can be done using person information as subject information.

The inter-camera link relation information generating apparatus of the invention is characterized by comprising display means for displaying video captured by the plural cameras, and display control means for controlling a display form of the display means.

According to the configuration described above, proper screen display capable of person tracking etc. can be performed based on link relation information indicating the presence or absence of a link relation between cameras estimated.

The inter-camera link relation information generating apparatus of the invention is characterized in that in the case of displaying a subject moving in a display position of the display means corresponding to the Out region of one camera of the plural cameras, the display control means highlights a display position of the display means corresponding to the In region of other camera of the plural cameras with a high probability of displaying the subject after movement according to the link relation information generated by the link relation information generation means.

According to the configuration described above, in the case of tracking a person, an appearance region candidate and a camera number appearing next can be grasped visually and also it is unnecessary to perform a complicated operation such as switching of a camera, so that a monitoring burden on a monitor is reduced and person tracking etc. can be performed easily and accurately.

The inter-camera link relation information generating apparatus of the invention is characterized in that in the case of displaying a subject moving in a display position of the display means corresponding to the Out region of one camera of the plural cameras, the display control means makes a display area of the display means corresponding to other camera of the plural cameras larger than a normal display area according to the link relation information generated by the link relation information generation means.

According to the configuration described above, it is unnecessary to perform a complicated operation such as switching of a camera, so that a monitoring burden on a monitor is reduced and person tracking etc. can be performed easily and accurately.

The inter-camera link relation information generating apparatus of the invention is characterized in that in the case of displaying a subject moving in a display position of the display means corresponding to the Out region of one camera of the plural cameras, the display control means changes a display position of the display means corresponding to each of the cameras so that a display position of the display means corresponding to the In region of other camera of the plural cameras with a high probability of displaying the subject after movement is adjacent to a display position of the display means corresponding to the Out region of the one camera according to the link relation information generated by the link relation information generation means.

According to the configuration described above, it is unnecessary to perform a complicated operation such as switching of a camera, so that a monitoring burden on a monitor is reduced and person tracking etc. can be performed easily and accurately.

The inter-camera link relation information generating apparatus of the invention is characterized in that the link relation information generated by the link relation information generation means includes movement time information between an arbitrary region of one camera of the plural cameras and an arbitrary region of other camera and the display control means separates a display position of the display means corresponding to the one camera from a display position of the display means corresponding to the other camera according to the link relation information.

According to the configuration described above, it is easy to visually grasp a link relation between cameras, so that a monitoring burden on a monitor is reduced and person tracking etc. can be performed easily and accurately.

The inter-camera link relation information generating apparatus of the invention is characterized in that when a shooting range of one camera of the plural cameras overlaps with a shooting range of other camera, the display control means overlaps a display position of the display means corresponding to the one camera with a display position of the display means corresponding to the other camera according to the link relation information generated by the link relation information generation means.

According to the configuration described above, it is easy to visually grasp a shooting range relation between cameras, so that a monitoring burden on a monitor is reduced and person tracking etc. can be performed easily and accurately.

Advantage of the Invention

According to the invention, a link relation is estimated using only a pair of similar subjects, for example, a pair of persons, so that a reduction in accuracy of the presence or absence of the link relation by error correspondence between cameras is improved and estimation of the link relation between cameras with high reliability can be done. Also, by previously forming In/Out regions and doing path estimation every region, person tracking (monitoring) etc. between cameras using link relation information between cameras can be performed properly while preventing a failure by an increase in the number of paths.

BRIEF DESCRIPTION OF THE DRAWINGS

FIG. 15 is a diagram showing a display example of highlighting a region with a high probability of appearance.

FIG. 16 is a diagram showing a display example of enlarging and displaying a region with a high probability of appearance.

DESCRIPTION OF REFERENCE NUMERALS AND SIGNS

| | |
|---|---|
| 10 | INTERFACE PART |
| 21 | FEATURE QUANTITY EXTRACTION PART |
| 22 | In/Out POINT EXTRACTION PART |
| 23 | In/Out REGION FORMATION PART |
| 24 | CORRELATION VALUE CALCULATION PART |
| 25 | FREQUENCY HISTOGRAM CREATION PART |
| 26 | LINK RELATION INFORMATION GENERATION PART |
| 27 | PARAMETER SETTING PART |
| 30 | DATABASE |
| 40 | DISPLAY CONTROL PART |
| 50 | DISPLAY PART |
| 100,101 | INTER-CAMERA LINK RELATION INFORMATION GENERATING APPARATUS |
| 200,201,202 | MONITORING CAMERA |
| 300 | NETWORK LINE |

BEST MODE FOR CARRYING OUT THE INVENTION

An inter-camera link relation information generating apparatus in embodiments of the invention will hereinafter be described in detail using the drawings.

First Embodiment

Figure 1:
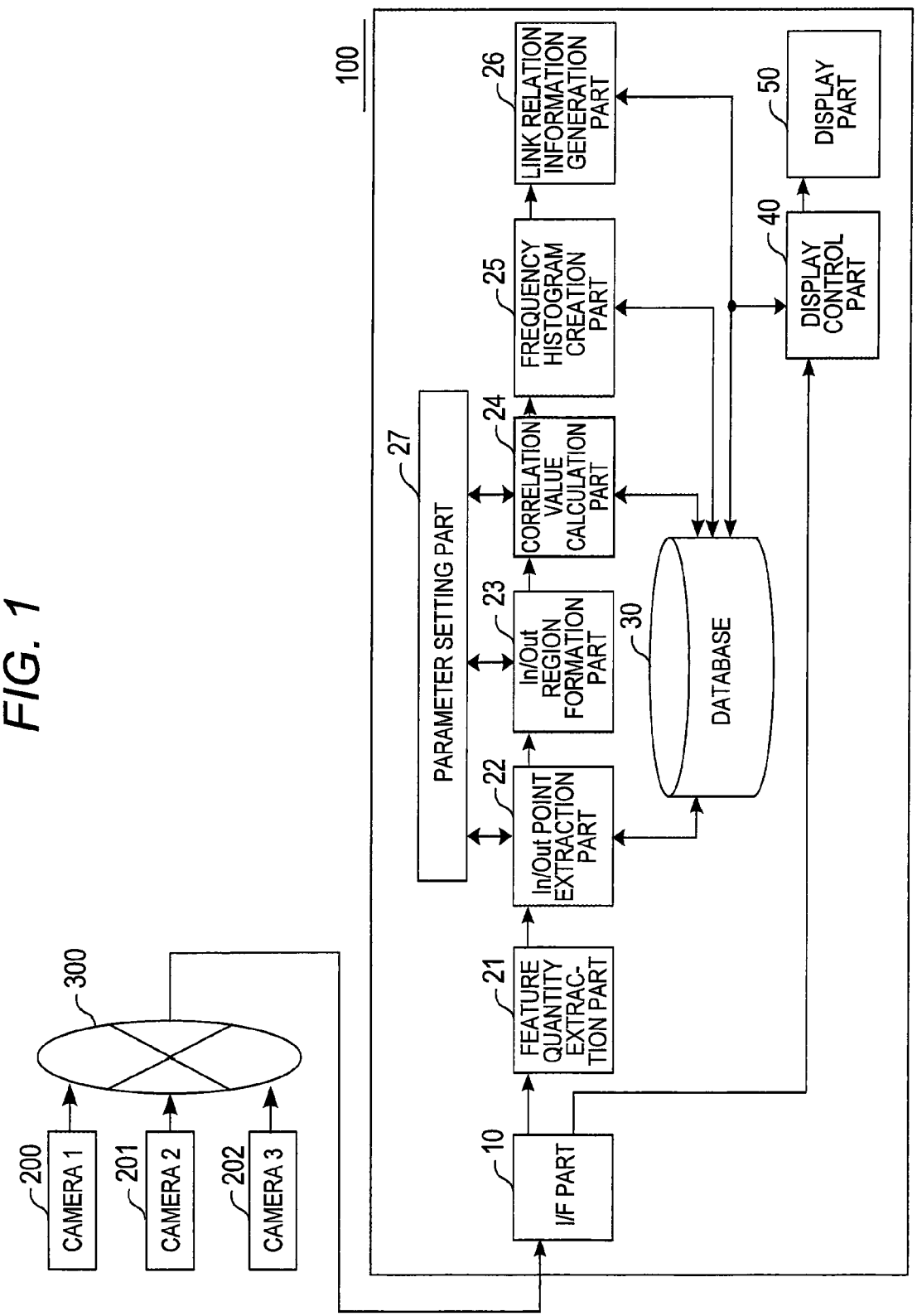
FIG. 1 is a block diagram showing an internal configuration of an inter-camera link relation information generating apparatus in a first embodiment of the invention.

FIG. 1 is a block diagram showing an internal configuration of an inter-camera link relation information generating apparatus in a first embodiment of the invention. An inter-camera link relation information generating apparatus 100 is mainly constructed of an interface (I/F) part 10, a feature quantity extraction part 21, an In/Out point extraction part 22, an In/Out region formation part 23, a correlation value calculation part 24, a frequency histogram creation part 25, a link relation information generation part 26, a parameter setting part 27, a database 30, a display control part 40, a display part 50, etc.

The inter-camera link relation information generating apparatus 100 acquires video from plural monitoring cameras (three cameras 200 to 202 are shown as an example in the drawings) through a network line 300 etc., and performs control or decision described below, and displays the video on the display part 50 of the inside of the apparatus.

The interface part 10 acquires video from the plural cameras 200, 201, 202 through the network line 300 etc.

The feature quantity extraction part 21 extracts a feature quantity of a person in video captured by each of the cameras. The extracted feature quantity is information about body height, speed, color, texture, etc.

The In/Out point extraction part 22 identifies a point appearing to a camera visual field as an In point and a point disappearing from the camera visual field as an Out point among person information observed by each of the cameras, and collects In/Out point information every camera for a certain period.

The In/Out region formation part 23 extracts an In/Out region as an In/Out region candidate group by region division processing of a k-means algorithm etc. in order to determine the In/Out region based on an In/Out point set obtained. Then, a region with small In/Out point information among the In/Out region candidate group or a region adjacent to other region is integrated and the final In/Out region is determined.

FIGS. 2 to 5 are diagrams describing situations in which an In region is formed as an action example of a function part of the In/Out region formation part 23 and the In/Out point extraction part 22 described above.

Figure 2:
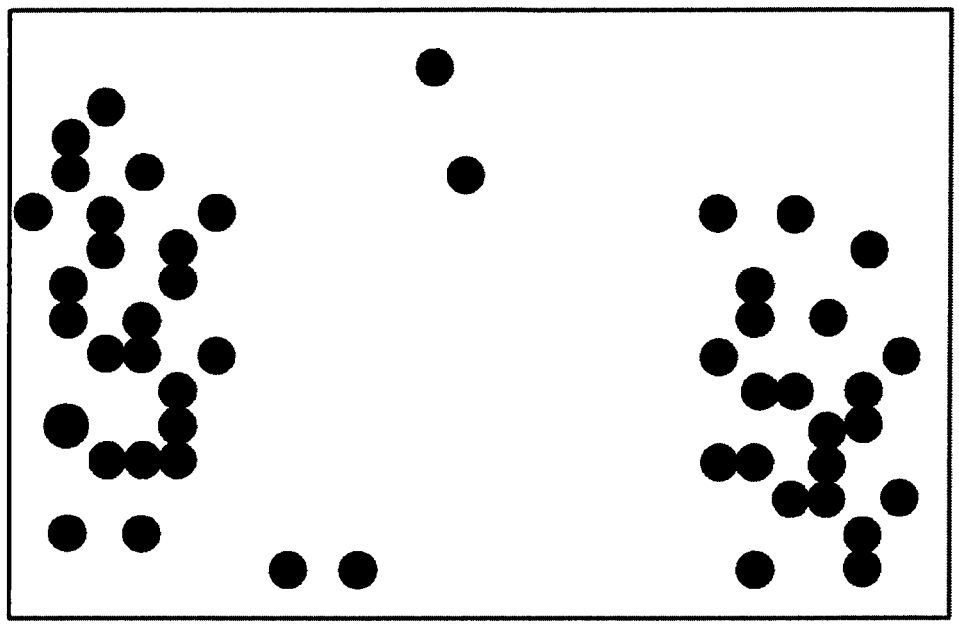
FIG. 2 is a diagram describing a situation in which an In region is formed (In point collection).
Figure 3:
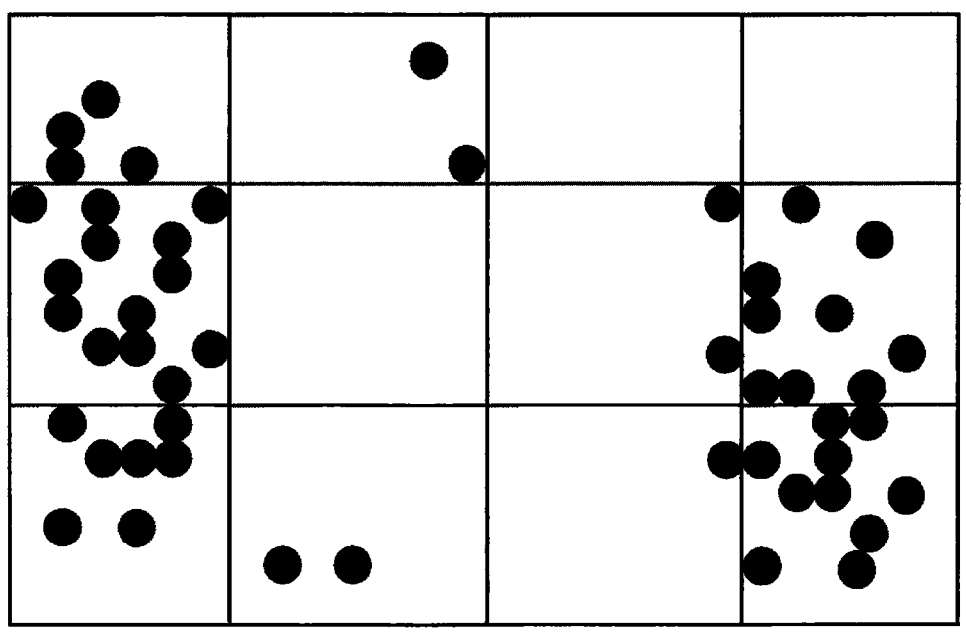
FIG. 3 is a diagram describing a situation in which the In region is formed (region division).
Figure 4:
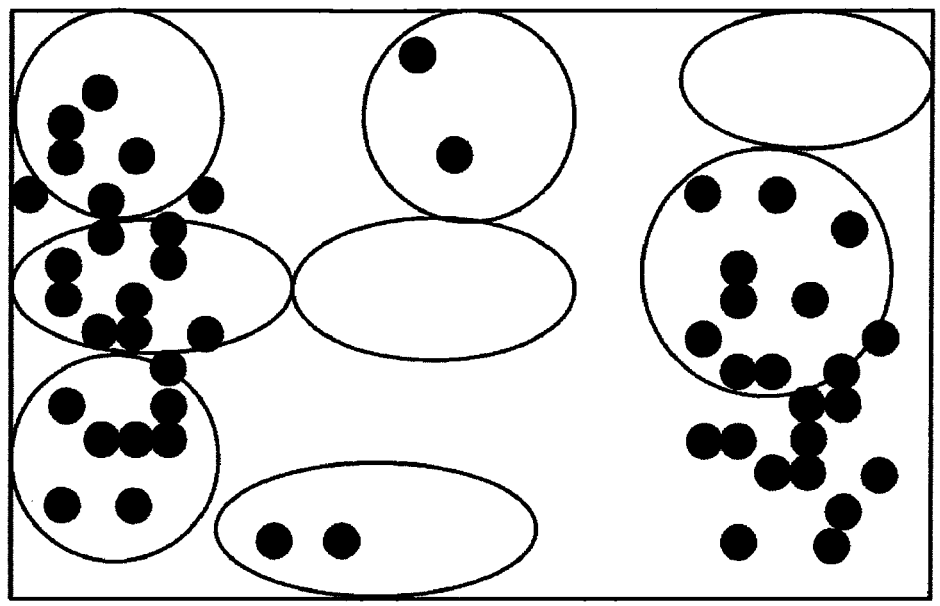
FIG. 4 is a diagram describing a situation in which the In region is formed (elliptical approximation).

First, the In/Out point extraction part 22 collects In points measured for only any time (FIG. 2). Next, an image region is initially divided into 12 regions (3 by 4) and region division processing is performed by a k-means method using In point information included within each of the regions (FIG. 3). Further, the k-means method is applied using an initial division result and elliptical approximation of each of the regions by singular value decomposition is made using the In point information included in each of the 12 divided regions as an element. Also, when the In point information included in each of the regions is smaller than a preset threshold value, the In point information is regarded as a noise region and is erased (FIG. 4).

Figure 5:
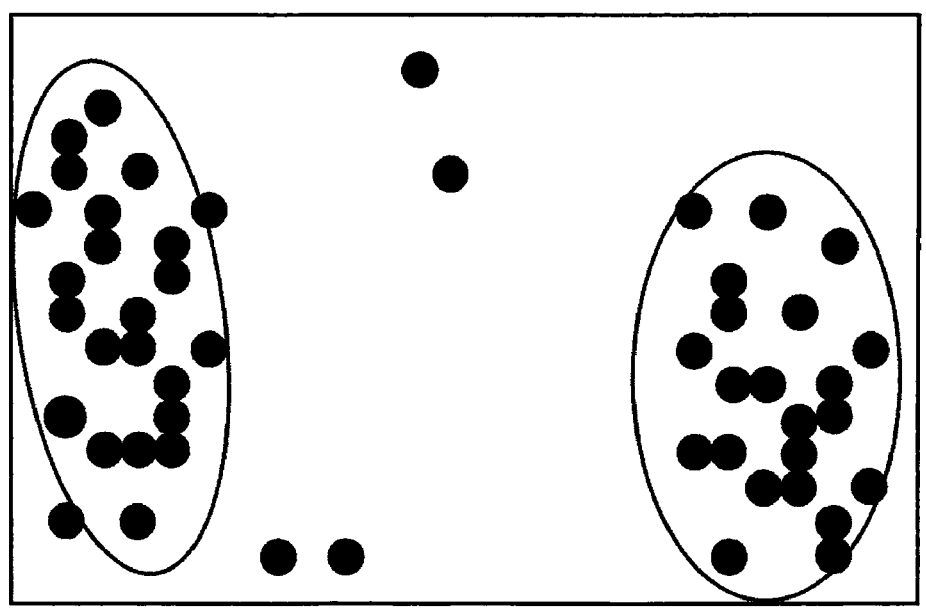
FIG. 5 is a diagram describing a situation in which the In region is formed (integration processing).

Then, the In/Out region formation part 23 performs integration processing with respect to each of the regions approximated to the ellipse. Processing for integrating adjacent regions with a threshold value or more is repeated and is continued until the integrated regions run out. Using a set of In points within the integrated region, elliptical approximation by singular value decomposition is made and the final In point region is acquired (FIG. 5).

The correlation value calculation part 24 calculates a correlation value for estimating a correspondence relation between each of the regions using an appearance region (In region) and a disappearance region (Out region) obtained in the above manner. In/Out point information about a person observed by each of the cameras holds various feature quantities such as time, the center of gravity, height, horizontal width, color information. When there is no overlap in a shooting range of the camera, with respect to a region having a link relation, a person disappearing from a certain disappearance region appears in an appearance region having the link relation after a certain period (the person appears in an appearance region before a certain period when there is overlap in the shooting range of the camera). Only a person having a similar feature quantity is selected from among information about persons appearing within a certain period as a correspondence candidate and is used in estimation of the link relation. A similarity of a person feature quantity in In/Out points is evaluated in a correlation value by the following formula 1.

[Mathematical formula 1]

$$\text{Correlation Value}_{In/Out}(t) = \sum_{i=0}^{n} w_i \cdot \text{Similarity}_i \quad \text{(Formula 1)}$$

Here, $w_i$ shows a weighting factor of each of the feature quantities and a $\text{similarity}_i$ shows a similarity of each of the feature quantities and t shows a search time window. That is, a correlation value in a predetermined search time window is calculated by the total sum of kinds (that is, i) of feature quantities of similarities weighted. Only information about a person having the similarity with a threshold value or more from the evaluation formula described above is used in estimation processing of the link relation.

The frequency histogram creation part 25 puts a pair of the obtained In/Out points in In/Out point correspondence frequency distribution constructed every In/Out region between the cameras. A pair of an In region and an Out region having the link relation actually have a peak of correspondence frequency in the vicinity of time according to a distance between the regions, and the presence or absence of the link relation can be determined by detecting its peak.

Correspondence processing of In/Out regions will herein be described using an example.

Figure 6:
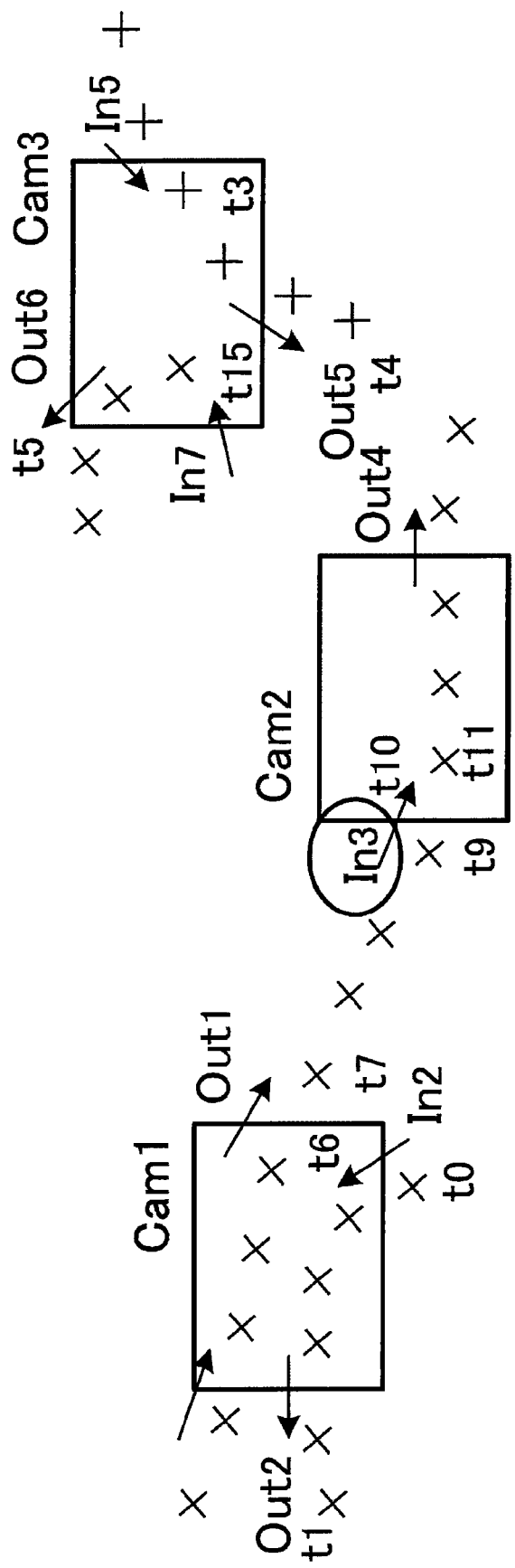
FIG. 6 is a diagram showing a movement example of a person between plural cameras.
Figure 7:
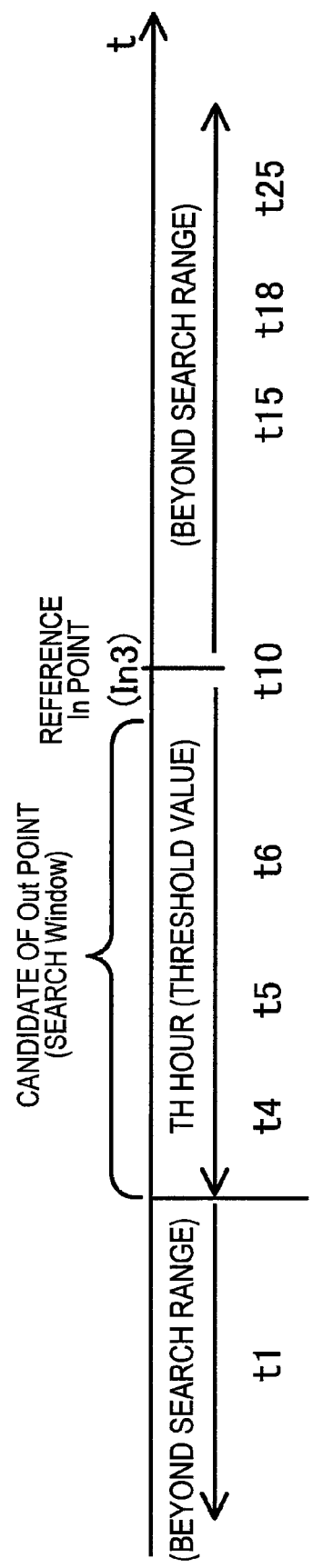
FIG. 7 is a schematic diagram conceptually showing a time range in which a candidate of an Out point is present.

FIG. 6 is a diagram showing a movement example of a person between plural cameras. A person disappearing from a certain camera again appears to another camera. In the example of FIG. 6, a person disappearing from a spot (hereinafter simply called Out1) shown by Out1 of a camera 1 (hereinafter called Cam1) at time t6 appears to a spot (hereinafter simply called In3) shown by In3 of a camera 2 (hereinafter called Cam2) at time t10. In the case of assuming that there is no overlap portion in an area captured by each of the cameras, it is considered that a person appearing to an In point often corresponds to the person (Out point) disappearing from any camera within the past certain time. Therefore, region correspondence between the plural cameras, that is, a link relation between the plural cameras can be estimated by obtaining a pair of persons corresponding between the cameras and measuring the time which it takes the pair of persons to correspond. In addition, FIG. 7 is a schematic diagram conceptually showing a time range in which a candidate of an Out point is present.

Figure 8:
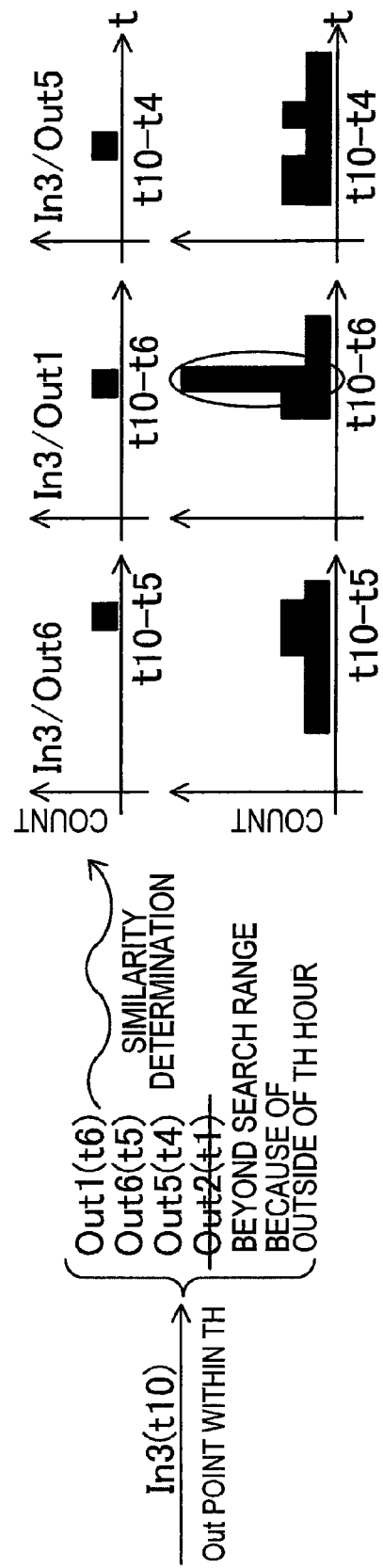
FIG. 8 is a diagram describing a situation of a plot of a correspondence pair of a histogram created by a frequency histogram creation part.

The frequency histogram creation part 25 creates a histogram in which correspondence points of In point/Out point are plotted with respect to combination of all the In regions and Out regions of each of the cameras. FIG. 8 is a diagram describing a situation of a plot of a correspondence pair of the histogram created by the frequency histogram creation part 25. This diagram shows a process of deriving Out regions corresponding to In3 with respect to the person movement example shown in FIG. 6. As is decided from FIGS. 6 and 7, the Out regions corresponding to In3 include Out1, Out6 and Out5, so that the Out regions are held as correspondence candidates.

In the example of the diagram, Out 1 has a link relation, so that many person pairs for the particular time portion of In3/Out1 are counted. In addition, there are cases where a correspondence pair of In/Out points occurs regardless of the absence of a link relation from a relation of appearance timing of other Out points, but such correspondence has a low possibility of having a peak with respect to a particular histogram element. A plot is performed in the above process and a histogram element having the peak (peak shown by an ellipse in the diagram) as shown in the lower portion of FIG. 8 is pinpointed finally.

The link relation information generation part 26 extracts this histogram element, and estimates the presence or absence of a link relation between the cameras, and generates link relation information.

Figure 9:
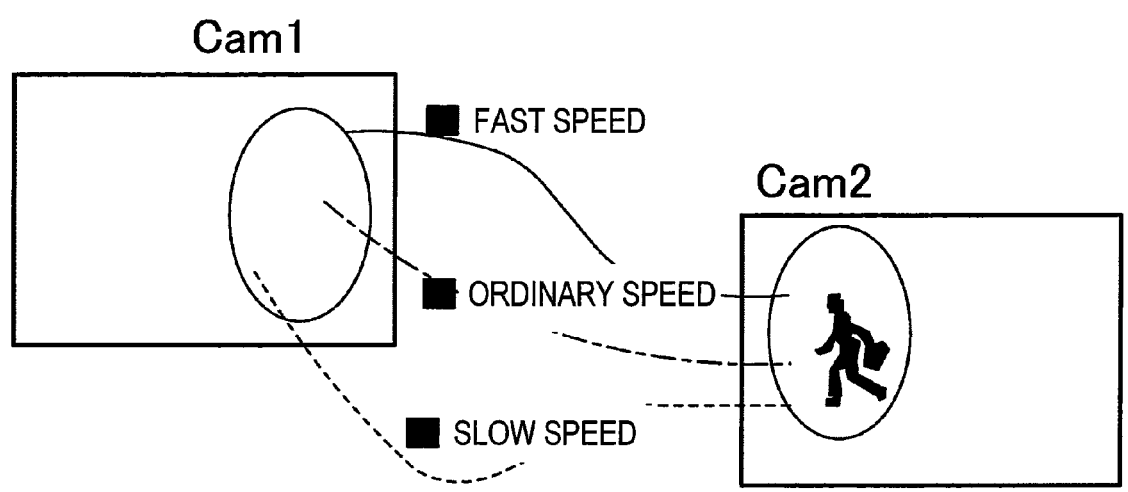
FIG. 9 is a diagram showing occurrence of a difference in arrival time by a walking speed.
Figure 10:
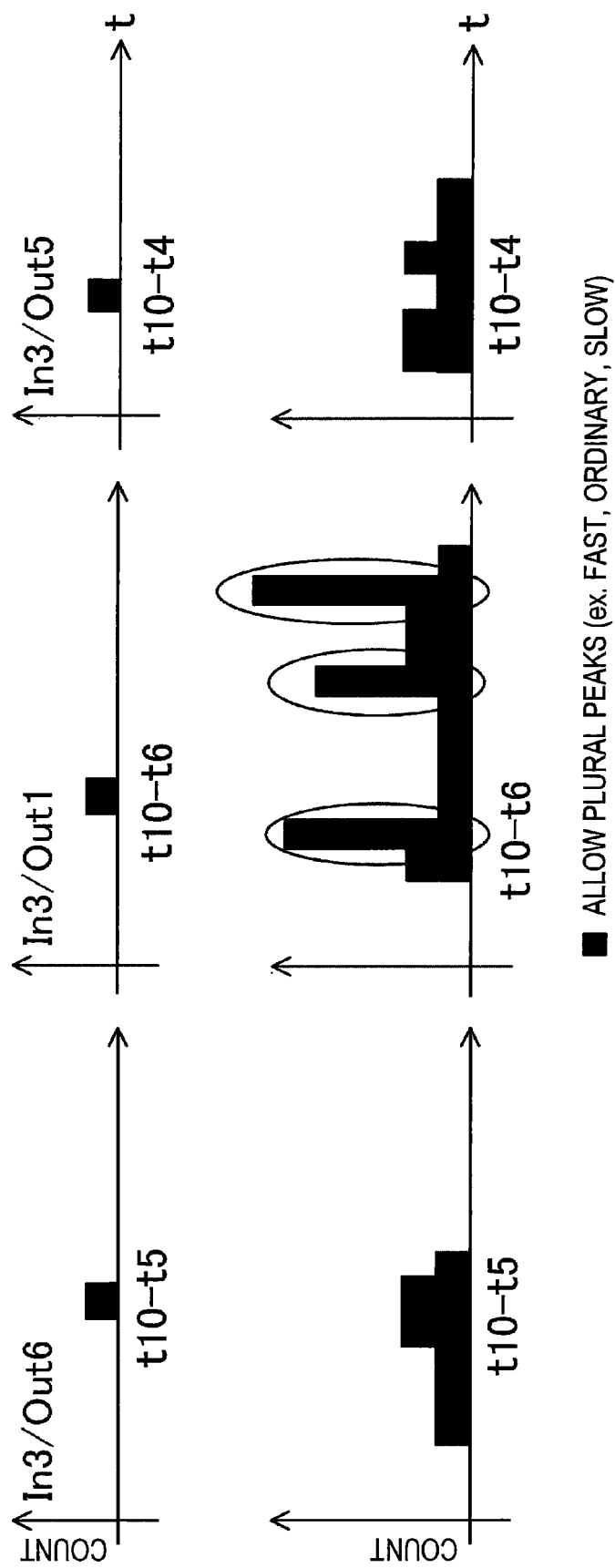
FIG. 10 is a diagram showing a histogram example having plural peaks.

In addition, in the example of the histogram of FIG. 8, the case of one peak is shown, but an actual walking speed varies depending on a person or an object (see FIG. 9). Hence, in the inter-camera link relation information generating apparatus 100 in the present embodiment, plural movement time computations can also be performed by assuming that plural speeds are had when movement time from a certain camera to another camera is derived. As shown in FIG. 10, plural peaks correspond to variations in the walking speed for a person and can also be grasped as variations in kinds of person, bicycle, car, etc.

The parameter setting part 27 sets parameters used in various computations described above. Also, the database 30 holds various data, inter-camera link relation information, etc. used in the computations.

Second Embodiment

Figure 11:
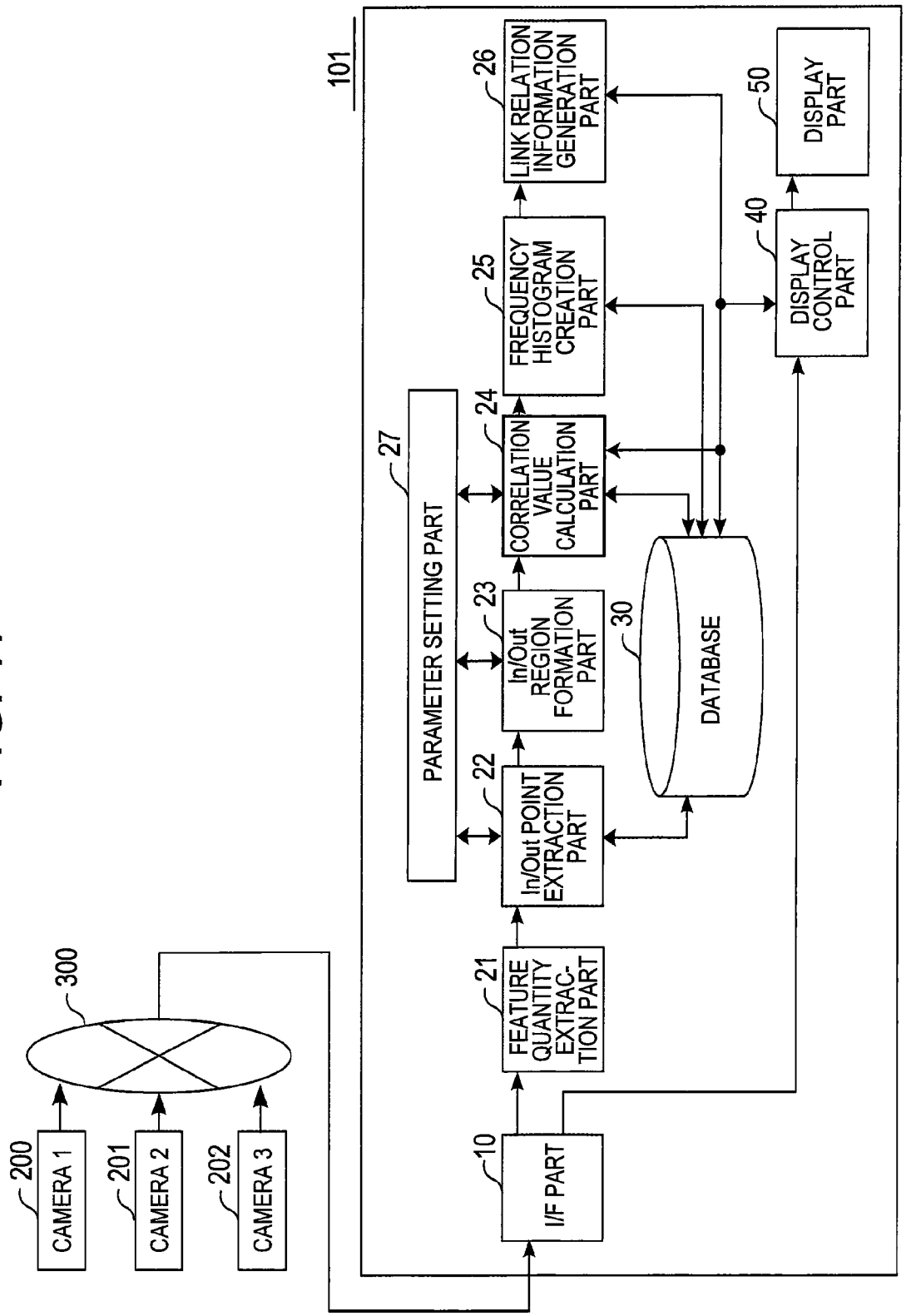
FIG. 11 is a block diagram showing an internal configuration of an inter-camera link relation information generating apparatus in a second embodiment of the invention.

FIG. 11 is a block diagram showing an internal configuration of an inter-camera link relation information generating apparatus in a second embodiment of the invention. An inter-camera link relation information generating apparatus 101 of the second embodiment differs from that of the first embodiment in that link relation information generated by a link relation information generation part 26 is fed back to a correlation value calculation part 24 and a similarity criterion described below is calculated. Since the other configuration is the same as that of the first embodiment, detailed explanation is omitted.

A similarity criterion calculation action of the inter-camera link relation information generating apparatus 101 of the above configuration will be described. The correlation value calculation part 24 determines a similarity between a person A and a person B based on link relation information described in the first embodiment. A similarity criterion is calculated by the following formula 2.

[Mathematical formula 2]

$$\text{Similarity Criterion} = \left\{ \sum_{i=0}^{n} w_i \right\} \cdot \text{Link Probability} \quad \text{(Formula 2)}$$
$$\text{of Link Relation } AB$$
$$= \{w1 \cdot \text{Body Height} + w2 \cdot \text{Speed Similarity} +$$
$$W3 \cdot \text{Color} + w4 \cdot \text{Texture}\} \cdot$$
$$\text{Link Probability}$$
$$\text{of Link Relation } AB$$

Here, $w_i$ shows a weighting factor of each of the feature quantities and a similarity$_i$ shows a similarity of each of the feature quantities.

Also, the same person determination criterion is determined based on the following formula 3.

[Mathematical formula 3]

Same Person Determination Criterion: (Formula 3)

$$\sum_{i=0}^{n} w_i \cdot \text{Similarity}_i > \text{MATCH\_TH}$$

Figure 12:
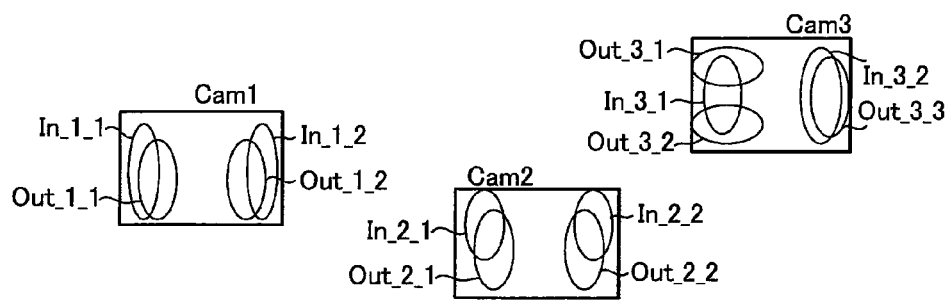
FIG. 12 is a diagram conceptually showing link relation information between cameras.

As shown in the formula 2, the product sum of similarity computations of body height, speed, color and texture is multiplied by link relation information (link probability of a link relation AB). That is, the link probability of a region number of a camera in which the person A appears and a region number of a camera in which the person B disappears is used as weight. The link probability of the link relation AB used herein is information indicating the estimated link relation between cameras described in the first embodiment, and is arranged in a matrix as shown in FIG. 12.

For example, when the link probability is 80%, the product sum of similarity computations is multiplied by a value of 80% and the final similarity value is obtained. The correlation value calculation part 24 performs plural correspondence candidate and similarity computations as a correspondence candidate of the person A appearing in the camera newly and selects the candidate with the maximum value among the candidates exceeding a threshold value (MATCH_TH) as a correspondence person.

When a person is tracked between plural cameras, a person disappearing from a certain camera often appears to another camera after a certain time. In other words, as the correspondence candidate of the person A appearing in the camera newly, the persons disappearing from each of the cameras until now could be picked up as the correspondence candidate. A selection action of a person correspondence candidate performed by the correlation value calculation part 24 will hereinafter be described.

Figure 13:
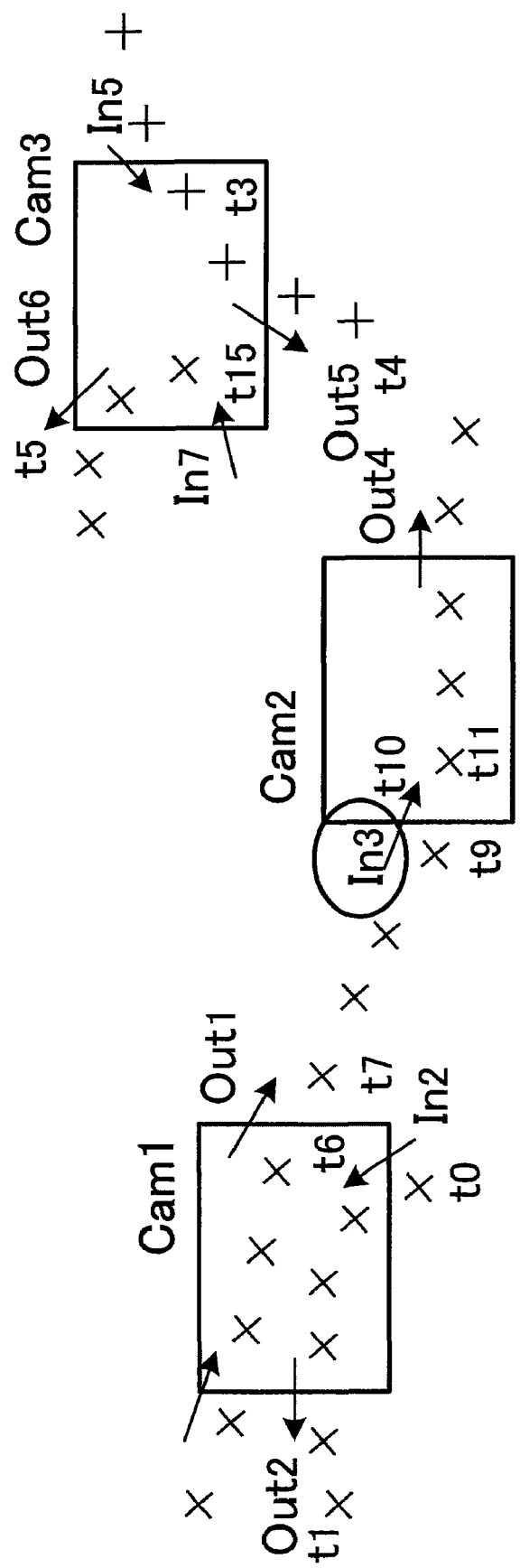
FIG. 13 is a diagram showing a movement example of a person between plural cameras.
Figure 14:
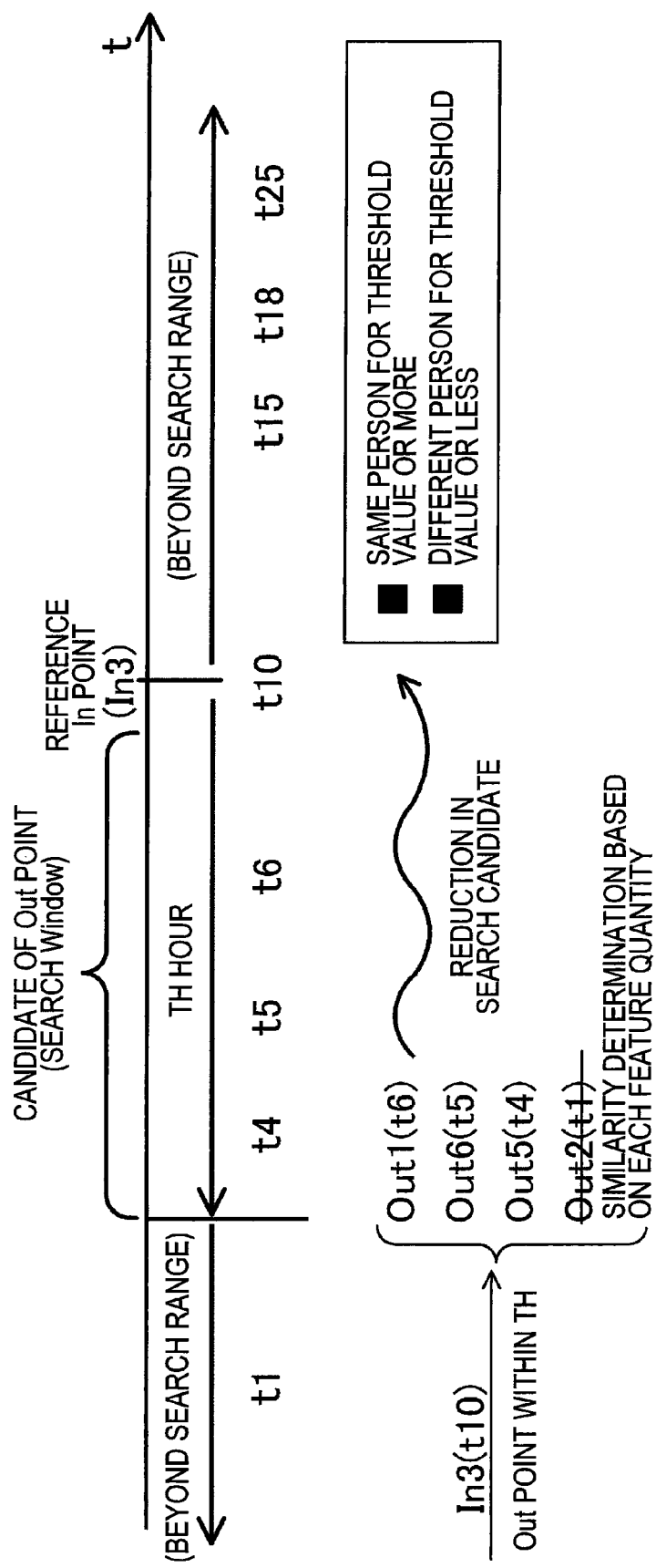
FIG. 14 is a schematic diagram conceptually showing a time range in which a candidate of an Out point is present.

FIG. 13 is a diagram showing a movement example of a person between plural cameras. When a new person appears to In 3 of Cam2 at time t10 (called a reference In point), a person corresponding to this In point becomes a person (called an Out point) disappearing from any camera. A candidate of the Out point corresponding to the reference In point becomes the Out point disappearing from the In point for the past TH hours. It is apparent from FIG. 14 that Out1 (t6), Out6 (t5) and Out4 (t4) present within the range dating from t10 back to TH hours become the candidate of the Out point. Similarities with these three candidates are respectively computed, and the candidate having the highest similarity and exceeding a threshold value of a determination criterion is associated.

Next, display control processing of the inter-camera link relation information generating apparatus in the embodiment of the invention will be described.

For example, in the case of tracking a moving person based on the same person determination criterion as described in the second embodiment, a display control part 40 performs the following display control so that a monitor can easily perform monitoring.

Figure 17:
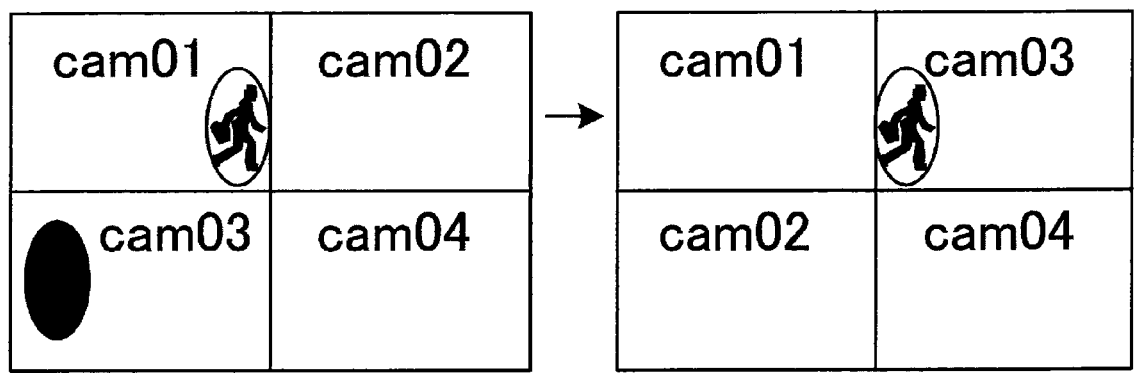
FIG. 17 is a diagram showing a display example of displaying a region with a high probability of appearance so as to be adjacent to video before movement.

(1) A shooting region of a camera with a high probability of next moving is highlighted according to inter-camera link relation information. For example, in an example in which nine monitoring cameras are arranged and video from each of the cameras is normally displayed with the screen divided into nine pieces, when the probability that a person moving from Cam1 to the right side appears in a certain region of the inside of Cam6 is high, the region is highlighted as shown in FIG. 15. (2) Video of a camera with a high probability of next moving is enlarged and displayed according to the inter-camera link relation information. For example, when the probability that a person moving from Cam1 to the right side appears in a certain region of the inside of Cam6 is high, an image of Cam6 is largely displayed as shown in FIG. 16. (3) Video is displayed with arrangement modified so that video of a camera with a high probability of next moving is adjacent to display of camera video before movement according to the inter-camera link relation information. For example, when the probability that a person disappearing from Cam1 appears inside Cam3 is high, arrangement of an image of Cam3 is changed to the right side of Cam1 and the image is displayed as shown in FIG. 17.

By the display control as described above, even when a person moves from a shooting range of a certain camera to a shooting range of another camera, a monitor can easily track the person. In addition, such display control can be performed by the display control part 40 even in the case of tracking the person moving in the first embodiment described above.

Next, map display of the inter-camera link relation information generating apparatus in the embodiment of the invention will be described.

Figure 18:
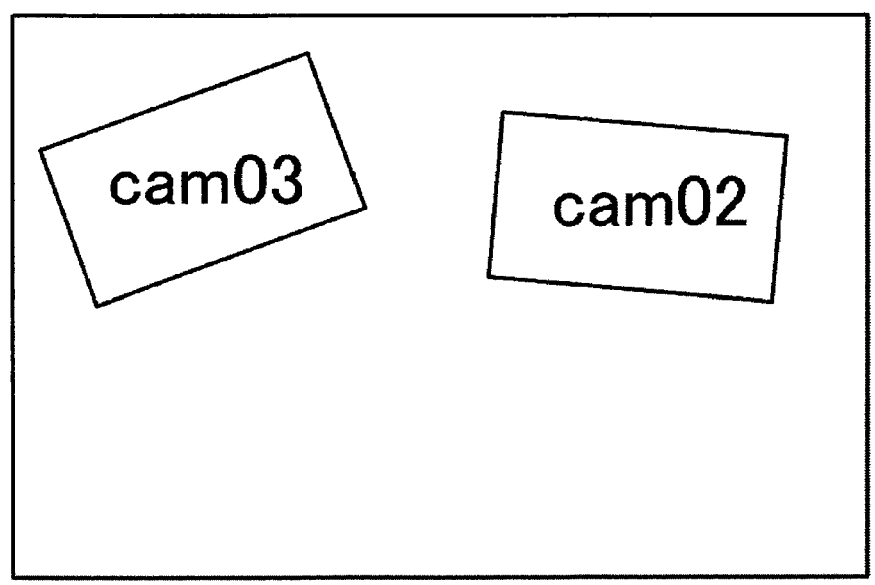
FIG. 18 is a diagram showing a display example of arranging video based on a link relation between cameras (separation).
Figure 19:
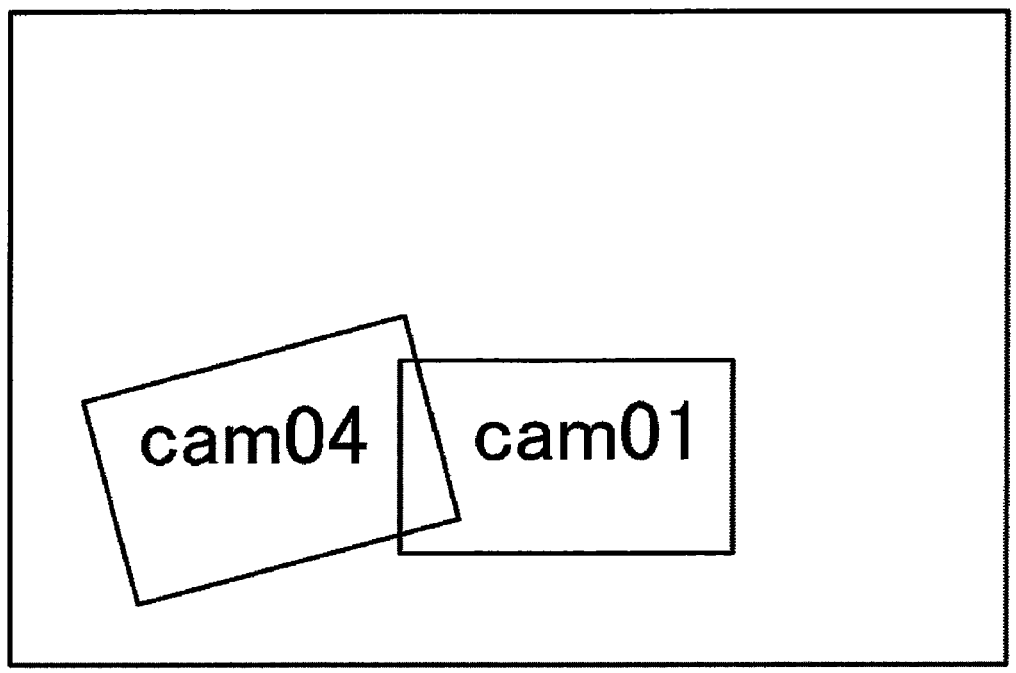
FIG. 19 is a diagram showing a display example of arranging video based on a link relation between cameras (overlap).

In the inter-camera link relation information generating apparatus in the embodiment of the invention, video according to a link relation is arranged based on inter-camera link relation information acquired. For example, when a probability of a link between an Out point of a certain camera and an In point of a certain camera is high and there is a time distance between disappearance and appearance of a person in corresponding regions, the display control part 40 separates and displays videos of both cameras as shown in FIG. 18. On the other hand, when a probability of a link between an Out point of a certain camera and an In point of a certain camera is high and disappearance and appearance of a person in corresponding regions are simultaneous (when shooting ranges of both cameras overlap), the display control part 40 properly overlaps and displays videos of both cameras as shown in FIG. 19.

By the display control as described above, even when a person moves from a shooting range of a certain camera to a shooting range of another camera, a monitor can easily perform visual recognition and track the person. In addition, the display control according to such map display can also be performed by the display control part 40 even in the case of tracking the person moving in the first embodiment described above.

The invention has been described in detail with reference to the specific embodiments, but it is apparent to those skilled in the art that various changes or modifications can be made without departing from the spirit and scope of the invention.

The present application is based on Japanese patent application (patent application No. 2007-055473) filed on Mar. 6, 2007, and the contents of the patent application are hereby incorporated by reference.

INDUSTRIAL APPLICABILITY

An inter-camera link relation information generating apparatus according to the invention has an effect capable of narrowing a correspondence destination by predicting a movement destination of a subject by estimation of a link relation with high reliability, and is useful in a monitoring system etc. for performing widespread monitoring using plural cameras.

The invention claimed is:

1. A method for generating link relation information among a plurality of cameras, comprising:

obtaining, via a network, a plurality of videos respectively captured by the plurality of cameras;

extracting a feature quantity of a subject from the plurality of videos captured by the plurality of cameras;

extracting an In point indicating a point to which the subject appears and an Out point indicating a point from which the subject disappears in each video, of the plurality of videos, captured by the plurality of cameras;

forming an In region including at least the In point extracted and an Out region including at least the Out point extracted;

calculating a correlation value by obtaining a total sum of similarities of each feature quantity of the subject extracted for respective combinations of In points included in the In region and Out points included in the Out region;

creating a frequency histogram based on the correlation value calculated;

extracting a peak of the frequency histogram created and estimating presence or absence of a link relation between the plurality of cameras; and generating link relation information based on the presence or absence of the link relation between the plurality of cameras.

2. The method according to claim 1, further comprising:

displaying on, a display unit, the plurality of videos based on the link relation information and controlling a display form of the display unit.

3. The method according to claim 2, wherein controlling the display form comprises, when displaying the subject moving in a display position of the display unit corresponding to the Out region of one camera of the plurality of cameras, highlighting a display position of the display unit corresponding to the In region of another camera of the plurality of cameras with a high probability of displaying the subject after movement according to the link relation information generated.

4. The method according to claim 2, wherein controlling the display form comprises, when displaying the subject moving in a display position of the display unit corresponding to the Out region of one camera of the plurality of cameras, making a display area of the display unit corresponding to another camera of the plurality of cameras larger than a normal display area according to the link relation information generated.

5. The method according to claim 2, wherein controlling the display form comprises, when displaying the subject moving in a display position of the display unit corresponding to the Out region of one camera of the plurality of cameras, changing a display position of the display unit corresponding to each camera of the plurality of cameras so that a display position of the display unit corresponding to the In region of another camera of the plurality cameras with a high probability of displaying the subject after movement is adjacent to a display position of the display unit corresponding to the Out region of the one camera according to the link relation information generated.

6. The method according to claim 2, wherein the link relation information generated includes movement time information between an arbitrary region of the one of the plural cameras and an arbitrary region of other camera, and the display control unit separates a display position of the display unit corresponding to the one of the cameras from a display position of the display unit corresponding to the other camera according to the link relation information.

7. The method according to claim 2, wherein controlling the display form comprises, when a shooting range of one camera of the plurality of cameras overlaps with a shooting range of another camera of the plurality of cameras, overlapping a display position of the display unit corresponding to the one camera with a display position of the display unit corresponding to the other camera according to the link relation information generated.

8. An inter-camera link generation apparatus, comprising:
an interface configured to acquire video, captured by a plurality of cameras, via a network;
a feature extraction unit configured to extract feature information of a person from respective video from the plurality of cameras;
a point identification unit configured to identify, from the video captured by the plurality of cameras, In points that indicate points, in respective visual fields of the plurality of cameras, at which the person appears and Out points corresponding point, in the respective visual fields, where the person disappears;
a region formation unit configured to group at least one In point into an In region and at least one Out point into an Out region;
a correlation unit configured to calculate a correlation value as a total sum of similarities of feature information of the person for respective combinations of the at least one In point included in the In region and the at least one Out point included in the Out region;
a histogram creation unit configured to generate a frequency histogram based on the correlation value;
a link relation generation unit configured to generate link relation information that specifies links between the plurality of cameras, the link relation generation unit being configured to identify a peak of the frequency histogram and determine, based on the peak, a presence or absence of a link relation between the plurality of cameras based on the presence or absence determined; and
a database configured to store at least one of the link relation information, the correlation value, the video acquired from the plurality of cameras, the feature information, or the frequency histogram.

9. The inter-camera link generation apparatus of claim 8, further comprising:
a display unit configured to display the video captured by the plurality of cameras; and
a display control unit configured to control display of the video on the display unit based on the link relation information.

10. The inter-camera link generation apparatus of claim 9, wherein the display control unit is further configured to highlight a first display position on the display unit corresponding to an In region of a first camera when a subject moves in an Out region of a second camera corresponding to the In region of the first camera, the In region of the first camera being an In region having a high probability, according to the link relation information, of displaying the subject after the subject moves through the Out region of the second camera.

11. The inter-camera link generation apparatus of claim 9, wherein the display control unit is further configured to enlarge a display area of the display unit corresponding to a first camera of the plurality of cameras to a size larger than a normal display area, when a subject moves in an Out region of a second camera and the link relation information indicates a link between the first camera and the second camera.

12. The inter-camera link generation apparatus of claim 9, wherein the display control unit is further configured to changing a display position of the display unit corresponding to each camera of the plurality of cameras so that a display position of the display unit corresponding to an In region of a first camera is adjacent to a display position of the display unit corresponding to an Out region of a second camera when a subject moves in the Out region of the second camera, the In region of the first camera having a high probability of displaying the subject after movement through the Out region of the second camera according to the link relation information.

13. The inter-camera link generation apparatus of claim 9, wherein the link relation information includes movement time information between an arbitrary region of one camera of the plurality of cameras and an arbitrary region of another camera of the plurality of cameras, and the display control unit is further configured to separate a display position of the display unit corresponding to the one camera from a display position of the display unit corresponding to the other camera according to the link relation information.

14. The inter-camera link generation apparatus of claim 9, wherein the display control unit is configured to overlap a display position of the display corresponding to a first camera with a display position of the display unit corresponding to another camera when a shooting range of the first camera overlaps with a shooting range of the second camera and the link relation information indicates a link relation between the first and second cameras.

* * * * *